US011424787B2

(12) United States Patent
Newman et al.

(10) Patent No.: US 11,424,787 B2
(45) Date of Patent: Aug. 23, 2022

(54) AI-BASED POWER ALLOCATION FOR EFFICIENT 5G/6G COMMUNICATIONS

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: ULTRALOGIC 6G, LLC, Palos Verdes, CA (US)

( * ) Notice: Subject to any disclaimer, the term of this patent is extended or adjusted under 35 U.S.C. 154(b) by 0 days.

(21) Appl. No.: 17/526,174

(22) Filed: Nov. 15, 2021

(65) Prior Publication Data
US 2022/0141773 A1 May 5, 2022

Related U.S. Application Data

(60) Provisional application No. 63/278,578, filed on Nov. 12, 2021, provisional application No. 63/276,745, (Continued)

(51) Int. Cl.
*H04W 72/04* (2009.01)
*H04W 52/22* (2009.01)
(Continued)

(52) U.S. Cl.
CPC .............. *H04B 7/01* (2013.01); *G01S 5/0027* (2013.01); *G01S 5/0054* (2013.01); *H04L 1/0003* (2013.01); *H04W 16/28* (2013.01); *H04W 52/08* (2013.01); *H04W 52/225* (2013.01); *H04W 52/282* (2013.01); *H04W 52/283* (2013.01);
(Continued)

(58) Field of Classification Search
CPC . H04W 52/08; H04W 52/225; H04W 52/283; H04W 72/0473; H04W 16/28; H04W 52/282; H04W 64/00; H04W 64/003; H04W 64/006; H04W 72/0453;
(Continued)

(56) References Cited

U.S. PATENT DOCUMENTS 6,167,268 A 12/2000 Souissi
6,593,880 B2 7/2003 Velazquez
(Continued)

*Primary Examiner* — John J Lee
(74) *Attorney, Agent, or Firm* — Mayer & Williams PC

(57) ABSTRACT

Base stations and user devices can transmit 5G and 6G messages with a wide range of transmission power levels. Selecting the appropriate power level for each message is a complex problem, dependent on the distance to the recipient, the background noise and interference level, priority, and many other conflicting factors. To provide an objective recommendation of the transmitter power level, an artificial intelligence model may be trained, using actual network and message parameters, to accurately predict the subsequent network performance versus power level. Then, a practical algorithm may be derived from the trained AI model, and used by base stations and user devices to select an appropriate transmission power level according to current network conditions and message properties. Use of an appropriate transmission power level for each message may reduce message faults, enhance reliability, mitigate external noise and interference, and save energy especially for battery-operated user devices.

14 Claims, 10 Drawing Sheets

Related U.S. Application Data filed on Nov. 8, 2021, provisional application No. 63/276,139, filed on Nov. 5, 2021, provisional application No. 63/274,221, filed on Nov. 1, 2021, provisional application No. 63/118,156, filed on Nov. 25, 2020, provisional application No. 63/117,720, filed on Nov. 24, 2020, provisional application No. 63/114,168, filed on Nov. 16, 2020.

(51) Int. Cl.
| | | |
|---|---|---|
| *H04B 7/01* | (2006.01) | |
| *H04L 1/00* | (2006.01) | |
| *H04W 72/02* | (2009.01) | |
| *H04W 52/28* | (2009.01) | |
| *H04W 64/00* | (2009.01) | |
| *G01S 5/00* | (2006.01) | |
| *H04W 16/28* | (2009.01) | |
| *H04W 52/08* | (2009.01) | |
| *H04W 28/02* | (2009.01) | |
| *H04W 92/18* | (2009.01) | |

(52) U.S. Cl.
CPC ......... *H04W 52/285* (2013.01); *H04W 64/00* (2013.01); *H04W 64/003* (2013.01); *H04W 64/006* (2013.01); *H04W 72/02* (2013.01); *H04W 72/048* (2013.01); *H04W 72/0453* (2013.01); *H04W 72/0473* (2013.01); *H04W 28/0268* (2013.01); *H04W 52/228* (2013.01); *H04W 92/18* (2013.01)

(58) Field of Classification Search
CPC ...... H04W 52/228; H04B 7/01; G01S 5/0027; G01S 5/0054
See application file for complete search history.

(56) References Cited

U.S. PATENT DOCUMENTS

| | | |
|---|---|---|
| 8,254,281 B2 | 8/2012 | Hadad |
| 2003/0125046 A1 | 7/2003 | Riley |
| 2007/0021122 A1* | 1/2007 | Lane ................. H04W 56/0025 455/67.16 |
| 2010/0124212 A1 | 5/2010 | Lo |
| 2011/0238286 A1 | 9/2011 | Roesser |
| 2013/0287080 A1 | 10/2013 | Li |
| 2014/0302872 A1 | 10/2014 | Lane |
| 2017/0208600 A1 | 7/2017 | Hsu |
| 2018/0083730 A1 | 3/2018 | Gulati |
| 2018/0138963 A1 | 5/2018 | Hernando |
| 2018/0206075 A1 | 7/2018 | Demirdag |
| 2018/0279246 A1 | 9/2018 | Gan |
| 2019/0222302 A1 | 7/2019 | Lin |
| 2019/0281561 A1 | 9/2019 | Sawai |
| 2019/0342841 A1 | 11/2019 | Wu |
| 2020/0186236 A1 | 6/2020 | Wang |
| 2020/0295809 A1* | 9/2020 | Wang ................... H04B 7/0626 |
| 2020/0296710 A1 | 9/2020 | Logothetis |
| 2020/0367067 A1 | 11/2020 | Haley |
| 2021/0022051 A1* | 1/2021 | Jia ..................... H04W 36/0079 |
| 2021/0029653 A1 | 1/2021 | Zhang |
| 2021/0136700 A1 | 5/2021 | Arad |
| 2021/0385755 A1 | 12/2021 | Zavesky |

\* cited by examiner

FIG. 6A

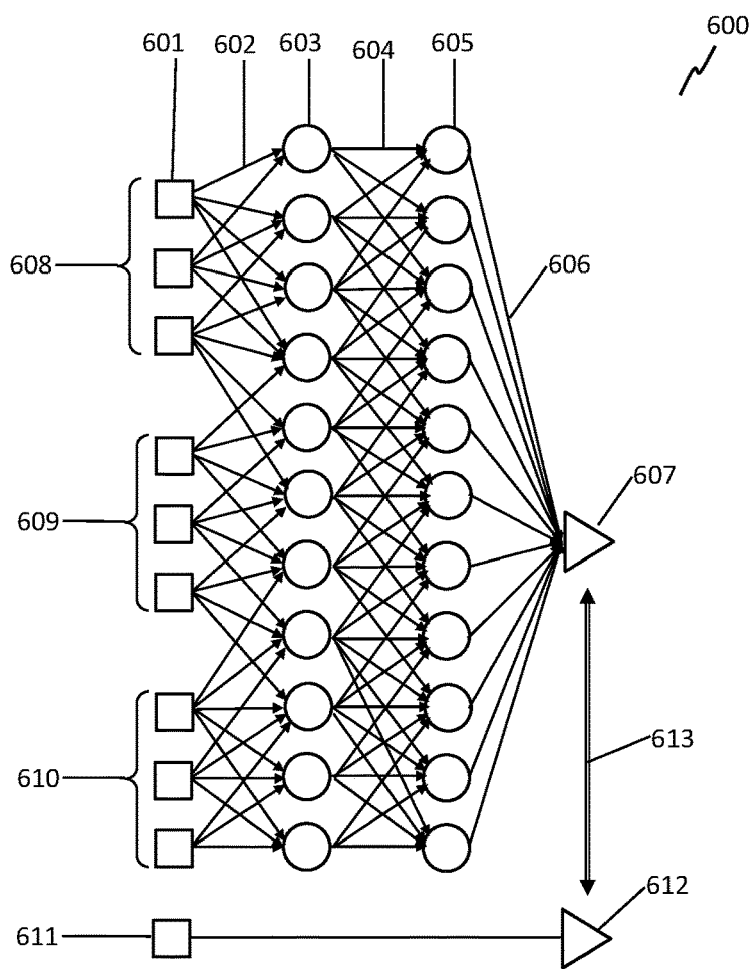

FIG. 6B

651 - DEVELOP A PREDICTIVE MODEL FOR NETWORK PERFORMANCE. COMPARE WITH MESSAGE POWER ALLOCATIONS.

652 - ACQUIRE LARGE AMOUNT OF DATA ON NETWORK PERFORMANCE, VARY THE INTERNAL VARIABLES AND IMPROVE THE PREDICTIONS.

653 - DEVELOP ALGORITHM TO SELECT BEST POWER ALLOCATION DEPENDING ON MESSAGE. NETWORK. EXTERNAL FACTORS.

654 - USE THE ALGORITHM TO SELECT POWER LEVELS FOR TRANSMITTING MESSAGES.

655 - OPTIONALLY, CONTINUE ACQUIRING NETWORK PERFORMANCE DATA AND CONTINUE REFINING THE AI MODEL.

AI-BASED POWER ALLOCATION FOR EFFICIENT 5G/6G COMMUNICATIONS

PRIORITY CLAIMS AND RELATED APPLICATIONS

This application claims the benefit of U.S. Provisional Patent Application Ser. No. 63/114,168, entitled "High-Power Transmission of Priority Wireless Messages", filed Nov. 16, 2020, and U.S. Provisional Patent Application Ser. No. 63/117,720, entitled "Automatic Frequency Correction for Wireless Mobile Communications", filed Nov. 24, 2020, and U.S. Provisional Patent Application Ser. No. 63/118,156, entitled "Automatic Frequency Correction for Wireless Mobile Communications", filed Nov. 25, 2020, and U.S. Provisional Patent Application Ser. No. 63/274,221, entitled "Rapid Doppler Correction for Mobile V2X Communication in 5G/6G", filed Nov. 1, 2021, and U.S. Provisional Patent Application Ser. No. 63/276,139, entitled "Location-Based Power for High Reliability and Low Latency in 5G/6G", filed Nov. 5, 2021, and U.S. Provisional Patent Application Ser. No. 63/276,745, entitled "AI-Based Power Allocation for Efficient 5G/6G Communications", filed Nov. 8, 2021, and U.S. Provisional Patent Application Ser. No. 63/278,578, entitled "Location-Based Beamforming for Rapid 5G and 6G Directional Messaging", filed Nov. 12, 2021, all of which are hereby incorporated by reference in their entireties.

FIELD OF THE INVENTION

Disclosed are systems and methods for using artificial intelligence to adjust the transmission power of wireless messages and improve 5G and 6G network performance.

BACKGROUND OF THE INVENTION

In prior-art 5G and 6G networks, each message is transmitted at a power level determined by a time-consuming feedback procedure based on a targeted level of reception. However, this may not be optimal when various competing messages have different priority levels and different message lengths, in networks with varying interference levels and varying sensitivity to electromagnetic backgrounds, with heavy or light traffic conditions, among many other relevant variables. Selecting a particular transmission power level for each particular message is a complex problem. What is needed is means for base stations and/or user devices to determine an appropriate transmission power level for each message according to properties of the message and current network conditions.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a base station in a wireless network to transmit a message, the method comprising: measuring one or more network parameters, one or more message parameters, and one or more environmental parameters; providing the measured network parameters, message parameters, and environmental parameters as inputs to an algorithm configured to provide, as output, a recommended transmission power level; and transmitting the message according to the recommended transmission power level.

In another aspect, there is non-transitory computer-readable media in a base station or core network of a wireless network, the media comprising instructions that when executed cause a method to be performed by the base station or core network, the method comprising: determining one or more message parameters of a particular message which is to be transmitted; measuring one or more pre-transmission network parameters of the wireless network before the particular message is transmitted; providing, as input to an algorithm, the one or more pre-transmission network parameters and the one or more message parameters; determining, as output from the algorithm, a particular transmission power level; and then transmitting the particular message according to the particular transmission power level.

In another aspect, there is a user device registered on a wireless network, the user device comprising a wireless transmitter and non-transitory computer-readable media, wherein: the media comprise an algorithm configured to take, as input, one or more parameters of a message and one or more environmental parameters, and to produce, as output, a recommended transmission power level; and the transmitter is configured to transmit a message according to the recommended transmission power level.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 6A is a schematic showing an exemplary embodiment of an artificial intelligence structure arranged to predict network behavior versus transmission power level, according to some embodiments.

FIG. 6B is a flowchart showing an exemplary embodiment of a procedure for a mobile user device and/or a base station to select a transmission power level, according to some embodiments.

Like reference numerals refer to like elements throughout.

DETAILED DESCRIPTION

Figure 1A:
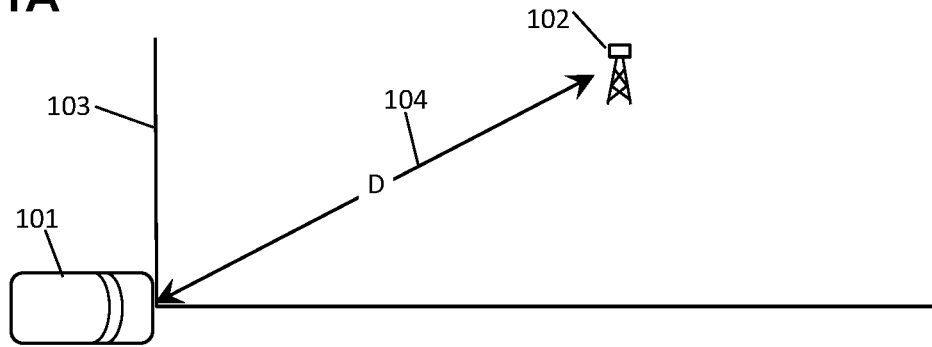
FIG. 1A is a schematic showing an exemplary embodiment of a mobile user device communicating with a base station, according to some embodiments.

Disclosed herein are systems and methods for developing and using an algorithm to control the transmitter power level of wireless messages according to message parameters, network parameters, and environmental parameters. In all 5G and 6G wireless communications, improved allocation of transmitted power can reduce wasted energy, improve latency and reliability, reduce interference, and provide enhanced network performance, according to some embodiments. Systems and methods disclosed herein (the "systems" and "methods", also occasionally termed "embodiments" or "arrangements" or "versions", generally according to present principles) can provide urgently needed wireless communication protocols to adjust transmitter power according to objective and tested criteria. With such improved power control, networks and their members can prevent message faults, enhance reliability, and provide low latency by avoiding retransmission delays. Versions detailed below can provide AI-based adjustment of transmitter power according to multiple competing inputs. Further protocols may be suitable for reduced-capability user devices, high-performance/high-demand customers on the managed 5G/6G channels, and independent V2V and V2X sidelink communications between user devices in motion.

Most wireless communications are not transmitted at the maximum power available, because that would waste energy (a consideration particularly for battery-operated devices), generate heat, and likely interfere with other users in adjoining networks. Especially in places where the spatial density of users is high (such as urban centers, automated manufacturing plants, stadiums), the potential for noise and interference from other transmitters becomes increasingly problematic. Therefore, base stations usually instruct users to restrict their transmission power based on the reception SNR (signal to noise ratio) or SINR (signal to interference and noise). The users may also send signal-quality reports back to the base station regarding the downlink signal quality received by the users, and those reports may enable the base station to adjust its own transmission power for reception by each user, but generally remaining well below the maximum transmission power available. There are many cases in which a user may need enhanced communication reliability or reduced latency, especially when reception deteriorates due to long range or presence of an obstruction, among other problems. In those cases it may be advantageous to enhance communication reliability and avoid retransmission delays by automatically increasing the transmission power above the level normally allowed or normally employed. This would be especially advantageous if a power scan, with its feedback messages and the like, could be avoided. That is the intent of this disclosure.

Terms herein generally follow 3GPP (third generation partnership project) standards, but with clarification where needed to resolve ambiguities. As used herein, "5G" represents fifth-generation and "6G" sixth-generation wireless technology. A network (or cell or LAN or local area network or the like) may include a base station (or gNB or generation-node-B or eNB or evolution-node-B or access point) in signal communication with a plurality of user devices (or UE or user equipment or nodes or terminals) and operationally connected to a core network (CN) which handles non-radio tasks, such as administration, and is usually connected to a larger network such as the Internet. Embodiments may include direct user-to-user ("sidelink") communication such as V2V (vehicle-to-vehicle) communication, V2X (vehicle-to-anything), X2X (anything-to-anything, also called D2D or device-to-device) and base station communications or V2N (vehicle-to-network). "Vehicle" is to be construed very broadly, including any mobile or transportable wireless communication device. The time-frequency space is generally configured as a "resource grid" including a number of "resource elements", each resource element being a specific unit of time termed a "symbol time", and a specific frequency and bandwidth termed a "subcarrier" (or "subchannel" in some references). Each subcarrier can be independently modulated to convey message information. Thus a resource element, spanning a single symbol in time and a single subcarrier in frequency, is the smallest unit of a message. Each modulated resource element of a message is referred to as a "symbol" in references, but this may be confused with the same term for a time interval. Therefore, each modulated reference element of a message is referred to as a "message element" in examples below. A "demodulation reference" is a set of modulated resource elements that exhibit levels of a modulation scheme (as opposed to conveying data), and each resource element of a demodulation reference is termed a "reference element" herein. A message may be configured "time-spanning" by occupying sequential symbols at a single frequency, or "frequency-spanning" on multiple subcarriers at a single symbol time (also called "frequency-first" if the message continues on multiple symbol times). "CRC" (cyclic redundancy code) is an error-checking code. "RNTI" (radio network temporary identity) or "C-RNTI" (cell radio network temporary identification) is a network-assigned user code. "QoS" is quality of service, or priority. "QCI" (QoS class identifier) defines various performance levels. A message is "unicast" if it is addressed to a specific recipient, and "broadcast" if it includes no recipient address. Transmissions are "isotropic"

if they provide roughly the same wave energy in all horizontal directions. A device "knows" something if it has the relevant information. A device "listens" or "monitors" a channel or frequency if the device receives, or attempts to receive, signals on the channel or frequency. A message is "faulted" or "corrupted" if one or more bits of the message are altered relative to the original message. "Receptivity" is the quality of reception of a message. "QPSK" (quad phase-shift keying) is a modulation scheme with two bits per message element, and 16QAM (quadrature amplitude modulation with 16 states) is a modulation scheme with 4 bits per message element. "AI" (artificial intelligence) is computer-based decision-making using variables which are adjusted or "trained" according to prior examples.

Embodiments of the disclosed systems and methods include an artificial intelligence calculation "structure" such as a neural net, operational in a computer and, when adjusted according to prior performance data of actual networks, forms an "AI model" of the network, configured to predict network performance according to input parameters. Further embodiments include a base station of a wireless network, containing non-transitory computer-readable media containing a formula or algorithm or the like, derived from an AI model and configured to determine a transmission power level for downlink messages to each user device in a network according to various parameters and input criteria. Further embodiments include a user device of a wireless network, containing non-transitory computer-readable media containing a formula or algorithm or the like, derived from an AI model and configured to determine a transmission power level for uplink messages to the base station. Further embodiments include a user device belonging to a short-range sidelink network, the user device containing non-transitory computer-readable media containing a formula or algorithm or the like, derived from an AI model and configured to determine a transmission power level for sidelink messages to other user devices.

Following are examples of a mobile user device adjusting its uplink transmission power, based on the distance between the user device and the base station.

FIG. 1A is a schematic showing an exemplary embodiment of a mobile user device communicating with a base station, according to some embodiments. As depicted in this non-limiting example, a user device 101, depicted as a vehicle in top view, is in communication with a base station 102, depicted as an antenna. Locations of the user device 101 and the base station 102 are relative to a reference frame 103, such as the geographic latitude and longitude, or other suitable frame. The distance D 104 between the user device 101 and the base station 102 is indicated. To determine the distance 104, the user device 101 can determine its own location using, for example, a satellite-based navigation system such as GPS, or a map, a local address, or other suitable geographical locating system. The user device 101 can also determine the location of the base station 102 using a published database of network information, or a map, or a previous registration on that base station, or a message from the base station 102, or from another base station having the relevant data, or other suitable means for locating the base station. The user device 101 can then calculate the distance 104 according to a suitable formula, such as the square-root of: the square of the difference in latitude values, plus the square of the difference in longitude values.

The user device 101 can then determine a transmission power level according to the distance 104. For example, the user device 101 may include (in non-transitory computer-readable memory) an algorithm, formula, computer code, tabulation, or other way of relating the transmission power level to the distance 104. For example, the algorithm may select a lower power level for shorter distances to avoid overdriving the base station receiver, and higher power levels for longer distances to enable the base station to receive a message reliably. Using that selected power level, the user device 101 may then transmit an uplink message to the base station 102 indicating, among other data, the location of the user device 101, or the distance calculated, or both. The base station 102 may then repeat the distance calculation and/or employ its own algorithm to determine a sufficient power level for downlink communications with the user device 101 across that distance 104. The base station 102 may then transmit an acknowledgement to the user device 101 using that sufficient power level. In some embodiments, the uplink message and/or the acknowledgement may be transmitted according to 5G or 6G technology.

An advantage of determining the distance 104 and the selected power level before transmitting the message, may be that the message may arrive at the destination with sufficient amplitude to be reliably received, but not so much amplitude that it would overdrive the receiver or interfere with other user devices elsewhere. Another advantage may be that a time-consuming "power scan" may be avoided. (A power scan is a time-consuming iterative procedure by which the user device repeatedly transmits short messages at various power levels and the base station indicates which messages are detected and, optionally, the amplitude level received. A second power scan may then be carried out with the base station varying the downlink power and the user device indicating receptivity.) Another advantage may be that the message may be received with high reliability and low latency, by avoiding message faults due to insufficient power. A further advantage may be that the user device may avoid the delays and energy wastage involved in receiving a non-acknowledgement (or no acknowledgement within a predetermined interval) and then retransmitting the message at a higher power level.

Another advantage may be that the depicted procedures may be compatible with devices that may have difficulty complying with prior-art 5G or 6G registration procedures. Another advantage may be that the depicted procedures may be implemented as a software (or firmware) update, without requiring new hardware development, and therefore may be implemented at low cost, according to some embodiments. The procedures may be implemented as a system or apparatus, a method, or instructions in non-transitory computer-readable media for causing a computing environment, such as a user device, a base station, or other signally-coupled component of a wireless network, to implement the procedure. As mentioned, the examples are non-limiting. Other advantages may be apparent to skilled artisans after reading this disclosure. The advantages in this paragraph may apply equally to other embodiments described below.

Figure 1B:
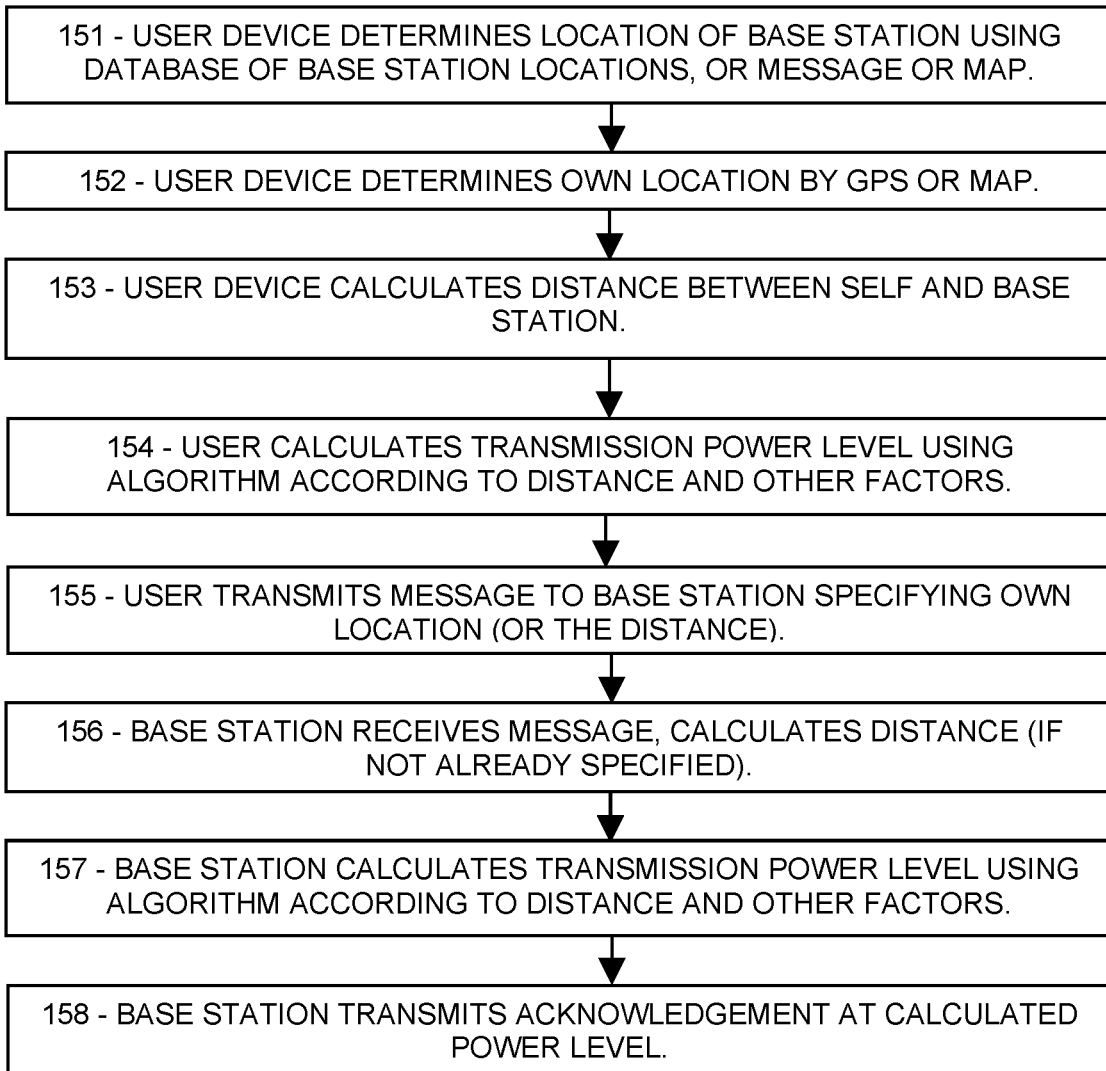
FIG. 1B is a flowchart showing an exemplary embodiment of a procedure for a mobile user device and a base station to adjust their transmission power levels, according to some embodiments.

FIG. 1B is a flowchart showing an exemplary embodiment of a procedure for a mobile user device and a base station to adjust their transmission power levels, according to some embodiments. As depicted in this non-limiting example, at 151 a mobile user device, such as a vehicle, determines the location of a base station, such as a base station proximate to the user device. The user device may determine the base station's location using a publicly accessible tabulation of base station locations, or a message from that base station or another base station or another transmitter, or a map of base station locations, or other way of finding the base station's location. Then, if not sooner, the user device determines, at 152, its own location using, for example, GPS or other means. At 153 the user device calculates the distance between itself and the base station according to the locations determined.

At 154, the user device calculates a transmission power level to use in communicating with the base station. That calculation may employ an algorithm or formula or function or computer code or graphical correlation or interpolatable tabulation or other means for determining a suitable and sufficient power based at least in part on the distance. At 155, the user device transmits an uplink message using the calculated power level. The transmission power level may be adjusted by adjusting an amplifier in the transmitter, or digitally by calculating a transmission waveform with a particular amplitude, or other means well known in the radio arts. In some embodiments, the uplink message may include an indication of the user device's location, or of the calculated distance, or other data enabling the base station to adjust its power level corresponding to the distance.

At 156, the base station receives the uplink message and adjusts its downlink transmission power level according to the distance. The base station may also check the user device's analysis by recalculating the distance, depending on which items of information are included in the uplink message. At 157, the base station may use an algorithm, or the like, to calculate a sufficient transmission power level based at least in part on the distance. The base station's power level may differ from that of the user device because their antennas may be quite different, among many other differences between the base station and the user device. Then, at 158, the base station may transmit an acknowledgement, or other message, to the user device, using the downlink power level thus determined.

The user device and the base station may thereby communicate with sufficient reliability upon their first exchanged messages, without performing power scans, and with little chance of message failure, according to some embodiments.

The systems and methods further include procedures for base stations to compensate for obscurations that may interfere with communications, based on the mobile user device location, as described in the following examples.

Figure 2A:
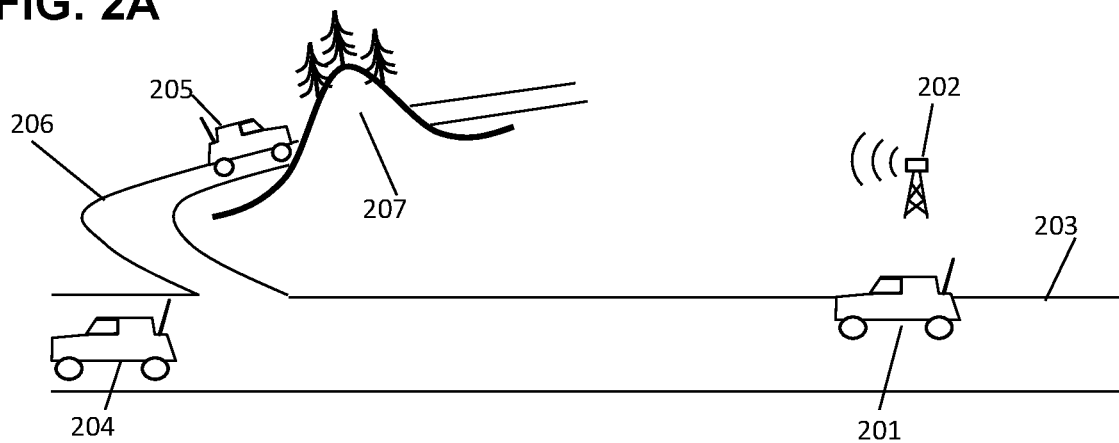
FIG. 2A is a sketch showing an exemplary embodiment of a mobile user device passing by an obscuration, according to some embodiments.

FIG. 2A is a sketch showing an exemplary embodiment of a mobile user device passing by an obscuration, according to some embodiments. As depicted in this non-limiting example, a first mobile user device 201, depicted as a vehicle, communicates with a base station 202, depicted as an antenna, while traveling on a main road 203. A second mobile user device 204 is on the same road 203 but farther ahead. The figure shows the first user device 201 quite close to the base station 202, while the second user device 204 is much farther from the base station 202. The user devices 201 and 204 may be configured to determine their distance from the base station 202, by comparing their own location to the base station's location, and may adjust their uplink transmission power levels accordingly to provide a particular signal amplitude as-received by the base station. The user devices 201 and 204 may also communicate their calculated distances to the base station 202, so that the base station 202 can adjust its downlink transmission power higher for the shorter distance of user device 201, and higher power for the longer distance of user device 204, and thereby provide sufficient amplitude as-received for reliable reception by each of the user devices 201 and 204.

In some embodiments, the first user device 201 may include, in its message to the base station 202, an indication of its speed and direction of travel, in addition to its current location. Using that information, the base station 202 may be configured to calculate the distance to that user device 201 as a function of time. The base station 202 can then adjust its downlink transmission power level according to the time-dependent distances, and thereby deliver sufficient receptivity while avoiding the need for frequent position-updating message exchanges from the user devices 201 and 204. In the position calculation, the base station 202 may assume that the velocity of the user device 201 remains constant at the stated value, and that the user device (if a vehicle) follows the curves of whatever road it is on, unless informed otherwise. The base station 202 may thereby calculate the distance as a function of time, and adjust its power level accordingly, without the need for frequent position-updating messages from the user devices 201 and 204.

The figure also shows a third user device 205 on a side road 206 that passes behind an obscuration depicted as a hill 207, which attenuates the signal. The base station 202 may calculate the location of the third user device 205 based on its speed and direction, as well as the way the side road 206 curves. The base station 202 may thereby determine that the user device 205 is about to pass behind the hill 207, and therefore may increase the transmission power of any messages to that user device 205. In addition, the base station 202 may calculate, based on the speed of the third user device 205, when it is expected to emerge from the obstruction 207, and may revert to the normal power level thereafter. In addition, the base station 202 may have previously determined (by experimentation, for example) how much to increase the transmit power, so that the third user device 205 may receive messages reliably while obscured.

Figure 2B:
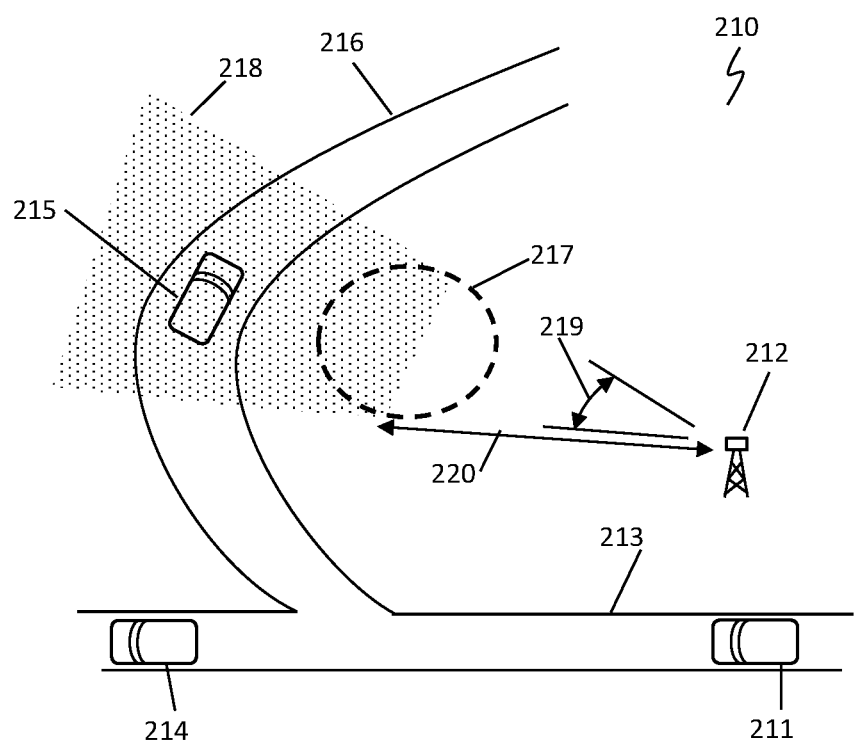
FIG. 2B is a schematic showing an exemplary embodiment of a base station compensating for signal attenuation, according to some embodiments.

FIG. 2B is a schematic showing an exemplary embodiment of a base station compensating for signal attenuation, according to some embodiments. As depicted in this non-limiting example, a map 210 of the scenario of FIG. 2A includes the first, second, and third user devices 211, 214, 215 on a main road 213 and a side road 216, plus a base station 212 and a hill 217 (in dash). Also shown is a region of reduced receptivity 218 (stipple) in which messages transmitted from the base station 212 are attenuated by the obscuration 217. The region of reduced receptivity 218 is determined, in this case, by the size of the hill 217, which subtends an angle 219 as viewed by the base station 212, at a distance 220 from the base station 212. Hence, as discussed, the base station 212, after receiving a message from the third user device 215 indicating its location and speed and direction, can determine that the third user device is on the section of the side road 216 that curves behind the obstruction 217. In addition, the base station 212 can calculate the times that the third user device 215 is expected to enter and exit the region of reduced receptivity 218. Accordingly, the base station 212 may increase its transmission power to an enhanced power level greater than the normal power level for that distance, and may transmit messages to the third user device 215 according to the enhanced power level while it is obscured, and may thereby compensate the attenuation, while the third user device 215 remains obscured. As mentioned, the base station 212 may have previously determined, from experiments for example, an attenuation level or an enhanced transmission power level, and thus to determine by how much to increase the power to keep the received message amplitudes roughly the same for mobile user devices inside and outside the region of reduced receptivity 218.

Mobile wireless users are generally quite familiar with the "dead zones" along the routes they routinely travel, where receptivity is poor. The base stations serving the area can generate an area map, such as that depicted but extending throughout a region. The area map may include contour levels or the like, indicating the degree of signal attenuation at each region, as viewed by each base station. Alternatively, the map may indicate what level of power is needed for adequate reception at each point in the area as viewed by the base station. Each base station can then adjust its power accordingly so that messages to user devices passing through each obscuration zone are properly received. Each base station's receptivity map may also indicate regions where the reception from that base station is so poor that the user device may be better served by another base station. In that case, the initial base station can arrange a hand-off to the other base station as the user device is approaching the obscuration, so that the user device can have uninterrupted service.

Figure 2C:
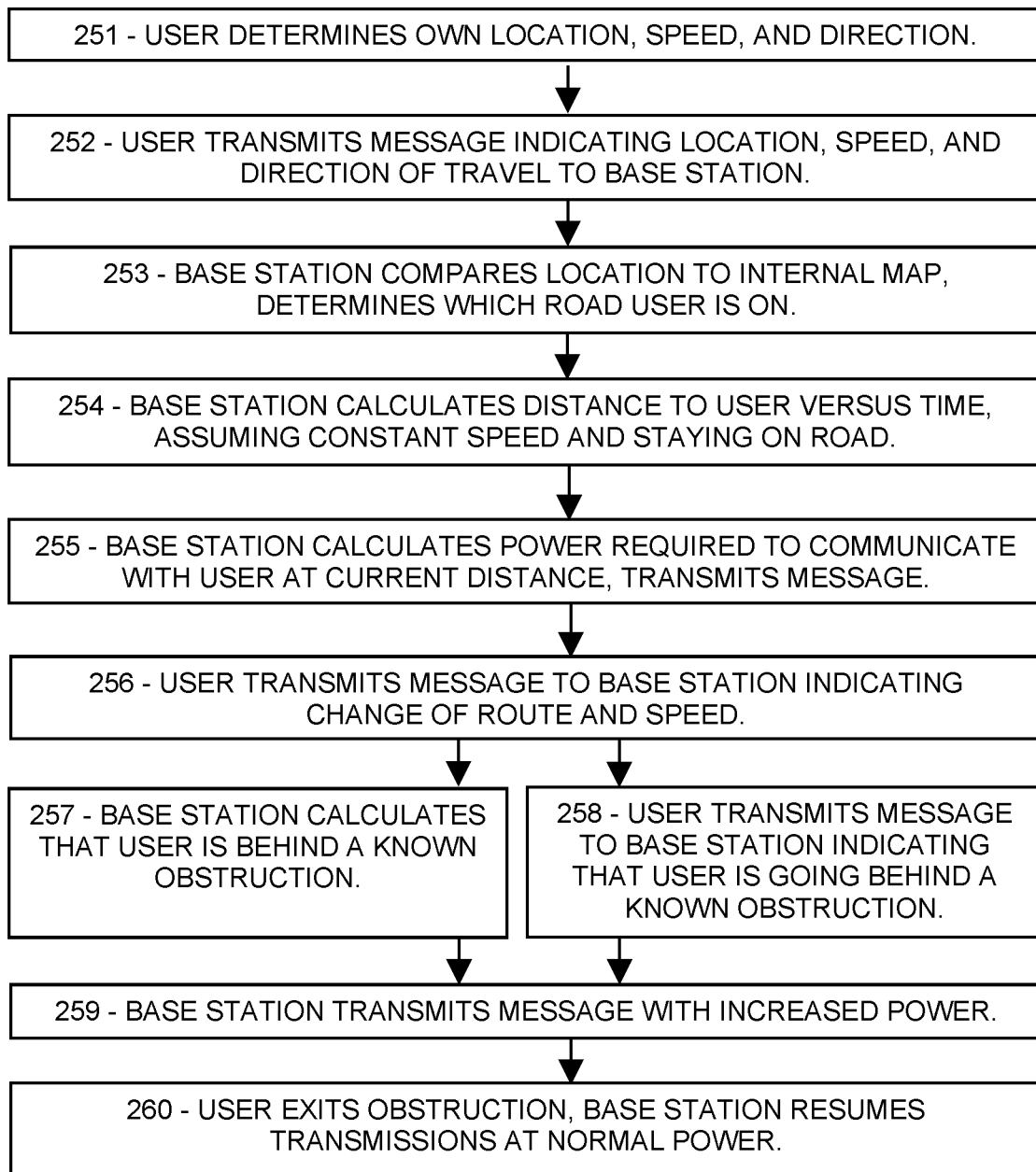
FIG. 2C is a flowchart showing an exemplary embodiment of a procedure for a mobile user device and a base station to compensate for signal obscuration, according to some embodiments.

FIG. 2C is a flowchart showing an exemplary embodiment of a procedure for a mobile user device and a base station to compensate for signal obscuration, according to some embodiments. As depicted in this non-limiting example, at 251, a mobile user device determines its own location, speed, and direction of travel using, for example, satellite navigation, a speedometer, and an electronic compass. At 252, the user device transmits a message with this information to a base station. At 253, the base station compares the location with a map (or database of road locations, contained in non-transitory computer-readable memory) to determine which road the user device is on. The base station may also check that the direction and speed are consistent with the road, and other consistency tests. At 254, the base station calculates a formula for the distance to the user device versus time, based on the speed. The base station may also take into account current traffic conditions, known changes in the road such as curves, and other factors that may influence the position extrapolation. Then at 255, the base station may have a message to send to the user device, and may calculate the distance from the base station to the user device at that moment using the formula, or according to the road map, or otherwise. Optionally, the base station may also monitor the amount of background noise or interference that may degrade the reception of the message. The base station may then determine how much transmitter power is required to transmit the message so that the user device will likely receive it without fault, based at least in part on the distance and/or the current background level, and then may transmit the message.

At 256, the user device has changed direction or speed, and therefore may transmit an uplink message to the base station informing it of the change. Using that updated information, at 257, the base station may calculate that the user device is about to pass behind a known obscuration. Alternatively, at 258, the user device may transmit a message indicating that it is about to pass behind an obscuration or is about to enter a known "dead zone" based, for example, on past experience. In either case, at 259, the base station may transmit a downlink message to the user device using increased transmitter power, to overcome the attenuation caused by the obscuration. At 260, the base station may determine that the user device has likely exited from the obscuration zone according to its stated speed, and therefore the base station may resume transmissions to the user device with the normal power level.

In this way a base station, or a core network attached to multiple access points, may keep track of the positions and receptivity of the various mobile user devices that they serve, and may increase or decrease transmission power to compensate for obstructions, and may thereby provide communications with relatively constant reliability as the user devices move around.

The systems and methods further include procedures for user devices to communicate directly with each other, not involving a base station. The user devices in such a sidelink communication may adjust their transmission power to provide sufficient reception to other user devices based on location, as described in the following examples.

Figure 3A:
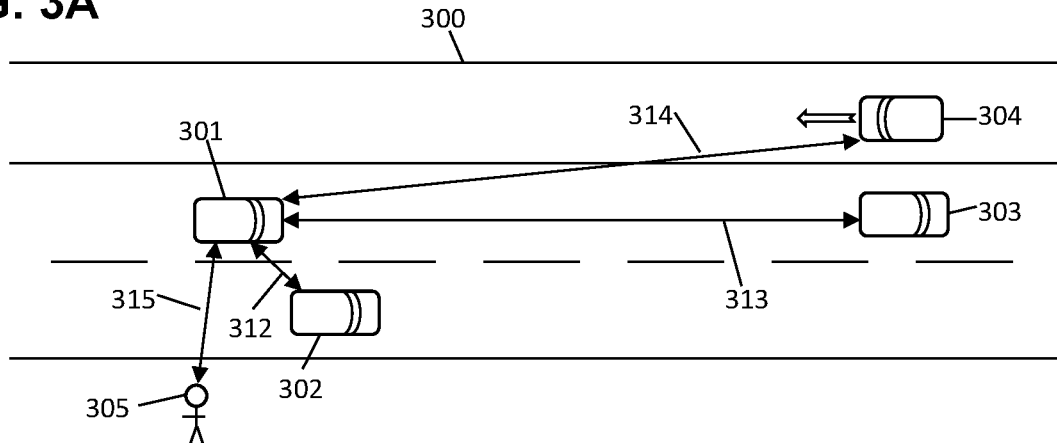
FIG. 3A is a schematic showing an exemplary embodiment of vehicles communicating with power compensation, according to some embodiments.

FIG. 3A is a schematic showing an exemplary embodiment of vehicles communicating with power compensation, according to some embodiments. As depicted in this non-limiting example, a first vehicle 301 is in communication with a second, third, and fourth vehicle 302, 303, 304 on a highway 300, as well as a pedestrian 305. The figure shows the distances 312, 313, 314 from the first vehicle 301 to the second, third, and fourth vehicles 302, 303, 304 respectively, and the distance 315 to the pedestrian 305.

Since the various entities are at different distances, the first vehicle 301 may transmit individual messages to them, each with a different power level, so that each receiving entity can receive each message with sufficient amplitude for reliable reception, but without wasting energy on excessively powerful transmissions. For example, the first vehicle 301 may broadcast a message indicating its location and optionally its speed and direction. The other entities 302-305 may receive that message and may reply by transmitting or broadcasting a responsive message specifying their own locations, and optionally their speeds and directions. (Such messages may assist the other vehicles in avoiding collisions, for example.) Thus each of the entities 301-305 can calculate the distance from itself to each other entity in the figure, and can determine a transmission power level according to the calculated distance, to provide sufficient message receptivity. In addition, if the speed and direction information are provided in the messages, each of the entities 301-305 can calculate future locations and future distances, and thereby can adjust the transmission power level for sufficient reception of future messages. For example, the first and third vehicles 301, 303 are on the same side of the highway 300 and therefore are likely traveling in the same direction and approximately the same speed, whereas the fourth vehicle 304 is traveling in the opposite direction as indicated by an arrow. The first vehicle 301 may determine that the distance between itself and the third vehicle 303 is likely constant or slowly varying, whereas the distance to the fourth vehicle 304 is likely changing very rapidly due to their opposite directions. In addition, the first vehicle 301 may determine that the distance 315 between itself and the pedestrian 305 may be changing slowly at first, since the location of the pedestrian 305 is nearly perpendicular to the direction of travel of the first vehicle 301, but that the distance will likely increase geometrically as the first vehicle 301 proceeds down the highway 300.

Figure 3B:
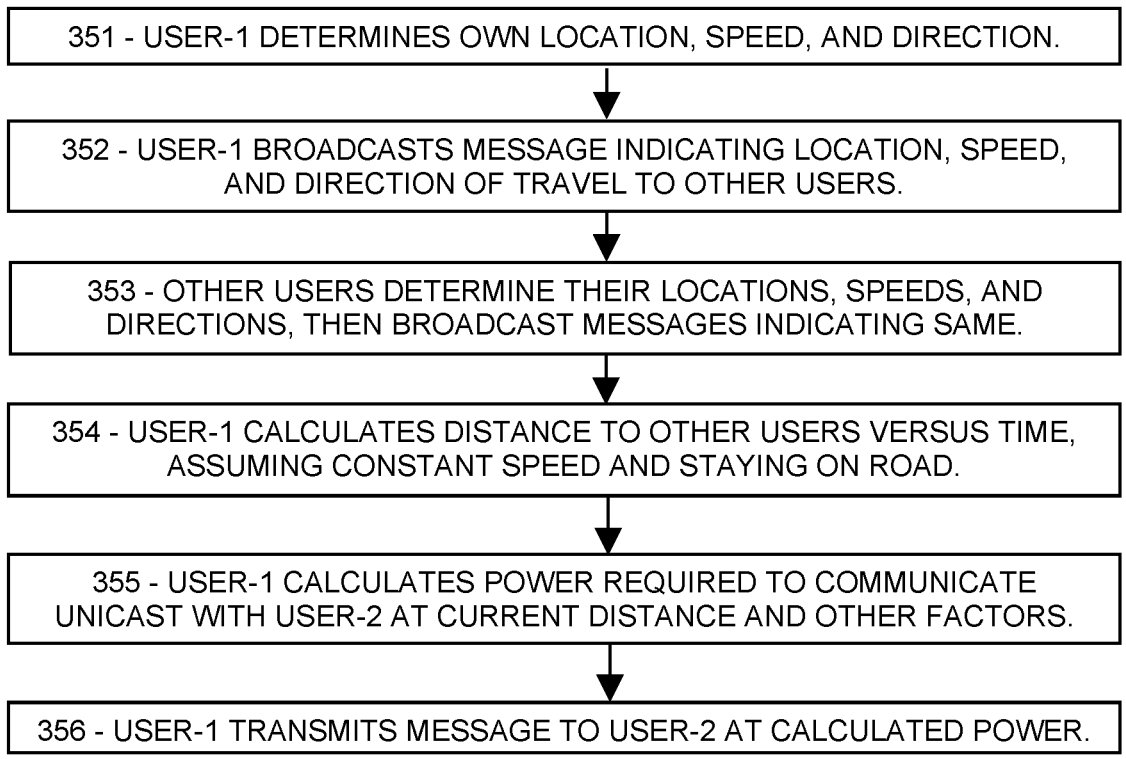
FIG. 3B is a flowchart showing an exemplary embodiment of a procedure for a mobile user devices to compensate for distance, according to some embodiments.

FIG. 3B is a flowchart showing an exemplary embodiment of a procedure for a mobile user device to compensate for distance, according to some embodiments. As depicted in this non-limiting example, a mobile user device User-1 communicates with a User-2 to adjust transmission power according to the distance between them. At 351, User-1 determines its own location, speed, and direction of motion, and at 352 broadcasts a message indicating those values to other user devices in range. At 353, the other user devices determine their locations, speeds, and directions, then broadcast messages indicating those values. All of the user devices receive each other's messages and determine from them the locations, speeds, and directions of the various devices.

At 354, User-1 calculates the distance to each of the other user devices according to their locations, and also determines formulas indicating the location of each user device versus time according to its speed and direction. For example, User-1 can determine a first time elapsed since User-1 determined its own location, and a second time elapsed since receiving the location message from a User-2. User-1 can assume that the speed remains constant unless informed of a change in speed. User-1 can then calculate the expected location of itself and of User-2 at the current time according to the elapsed times, speeds, and directions of the two entities, respectively. If User-1 has access to a map, such as an electronic roadmap for example, then User-1 can determine which road each user device is currently on based on the stated location, and can assume that each user device will remain on the same road until informed of a change, and therefore can project or calculate the position of each user device along each of the roads versus time including curves. It may not be necessary to assume that the direction of a user device remains constant because the road may curve; instead, the rate of travel along the road may be assumed to be constant.

At 355, User-1 has a message for User-2, and therefore User-1 calculates the expected location of User-2 at that time, based on User-2's stated initial location, speed, and direction, and based on the amount of time passed since User-2 transmitted its location message. User-1 may also determine its own position, which may have changed since User-1 transmitted its location message. Using that updated information, User-1 then calculates the current distance to User-2, and adjusts its transmission power accordingly. For example, User-1 may have a formula or algorithm or the like to determine a suitable transmission power level to use for satisfactory reception at the calculated distance. Then, at 356, User-1 transmits the message to User-2 with the power set according to the level so determined.

The systems and methods further include message formats for user devices to indicate their locations, and other information, to a base station and/or to other user devices, as disclosed in the following examples.

Figure 4A:
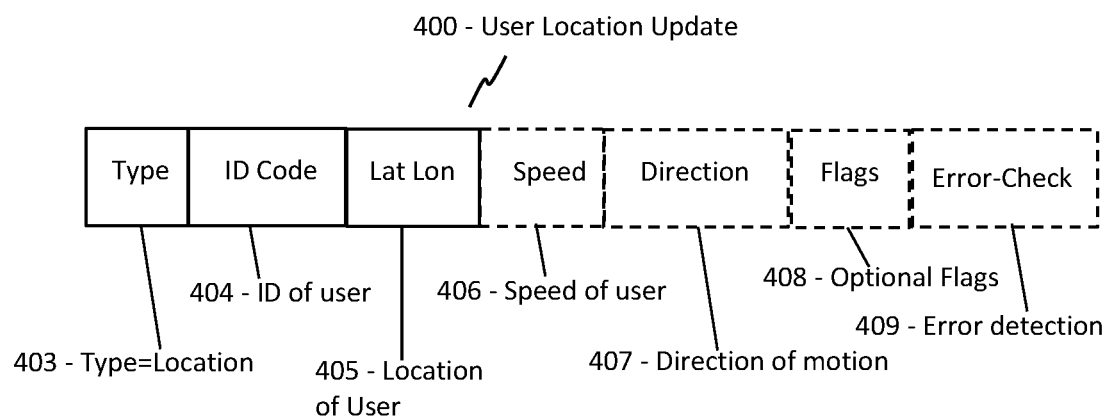
FIG. 4A is a schematic showing an exemplary embodiment of a message format for user devices to indicate locations to base stations, according to some embodiments.

FIG. 4A is a schematic showing an exemplary embodiment of a message format for user devices to indicate locations to base stations, according to some embodiments. As depicted in this non-limiting example, a user location update message 400, for a mobile user device to indicate its location to a base station, may include a message-type field 403, an identification code 404, a location field 405, an optional speed field 406, an optional direction field 407, an optional set of flags 408, and an optional error-check field 409. The message-type field 403 may include a code indicating that the message 400 is a location message including speed and direction. The identification field 404 may include a code such as the C-RNTI code or MAC address or other identifying code of the user device. The location field 405 may include the latitude and longitude of the user device, or a code related to the geographical coordinates. For example, it may not be necessary, in a local application, to include the full-degree portions of the latitude and longitude because the radio range of the base station is generally much less than 100 km corresponding roughly to one degree, over most of the surface of the Earth. In addition, depending on the spatial resolution required, it may not be necessary to indicate the coordinates to high precision. For example, a code including just the third, fourth, and fifth digit after the decimal point in decimal-degree notation may be sufficient to provide meter-scale resolution within a kilometer range, which may be sufficient for traffic applications and industrial automation applications, among others.

The speed field 406 may indicate the speed of the user device in units of, for example, meters per second. The direction field 407 may indicate the compass heading of the user device, or other measure of the direction of travel. This may be encoded as four bits providing an angular resolution of 22.5 degrees, or other encoding depending on the angular resolution required. The flags 408 may indicate, among many other things, whether the user device is accelerating, decelerating, or maintaining a constant velocity, which may help the receiving entity to extrapolate future positions. The error-check field 409 may include a parity code or a CRC or other code configured to reveal message faults.

In another embodiment, a user node may indicate its location and/or motion information during initial access, such as the 4-step initial access procedure in which the user node first transmits a random access preamble on the random access channel of a base station, and the base station replies with an RAR (random access response) message providing a grant. Using the grant, the user device then transmits "Msg3" or third access message, including its identification MAC (media access code) and other information, after which the base station transmits Msg4 (fourth access message) resolving any collisions. For example, the user device may include its location, and optionally its speed and direction of travel, in its Msg3 if the grant provides sufficient space, and if not, the user device may indicate in Msg3 that the user device has additional information to transmit. Then, Msg4 may include a second grant, with which the user device may transmit a fifth message including its location, speed, and direction of travel, among other information.

As an alternative option, the user device may transmit an acknowledgement after receiving Msg4, and may include in the acknowledgement a multiplexed scheduling request for transmitting a subsequent message indicating the location, speed, and direction of travel of the user device.

Figure 4B:
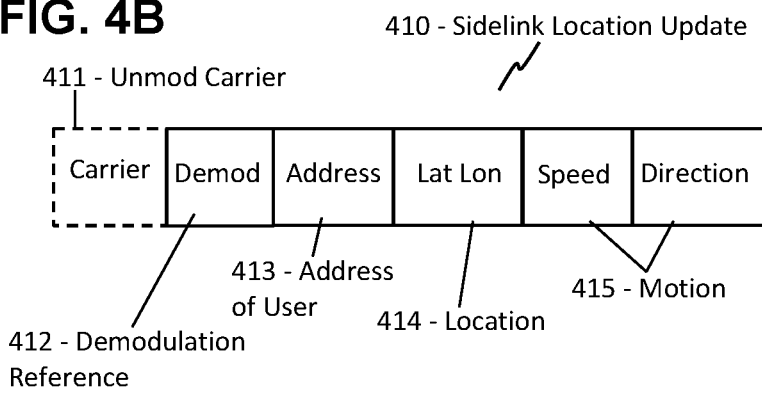
FIG. 4B is a schematic showing an exemplary embodiment of a message format for user devices to indicate locations to other user devices, according to some embodiments.

FIG. 4B is a schematic showing an exemplary embodiment of a message format for user devices to indicate locations to other user devices, according to some embodiments. As depicted in this non-limiting example, a sidelink location update message 410 may be broadcast by a mobile user device to inform other mobile and fixed user devices of the transmitting user device's location and motion. In this example, a base station is not involved. The message 410 may include an optional "carrier" field 411 with unmodulated carrier signal, a demodulation reference 412, an address field 413, a location field 414, and a motion field 415 including speed and direction.

The carrier field 411 may be provided to assist other user devices in determining the frequency of the rest of the message. The frequency may be affected by drifts in the time-base of the transmitting or receiving user device, Doppler shifts in frequency due to the motions of the user devices, and other effects. The carrier field 411 may enable the receiving entity to adjust its time-base for optimal reception of the rest of the message. The demodulation reference 412 may be a regular DMRS (demodulation reference signal) which is generally encoded in a complex way. Alternatively, the demodulation reference 412 may be a low-complexity short-format demodulation reference with two reference elements, configured to exhibit the maximum and minimum amplitude levels, and the maximum and minimum phase levels, of the modulation scheme, from which the remaining levels can be calculated by interpolation. Alternatively, the short-format demodulation reference 413 may include four reference elements, exhibiting all of the amplitude levels and phase levels of 16QAM, or all of the phase levels in QPSK, for example, so that no interpolation is needed. Providing the demodulation reference 412 within the message 410 may assist the other user devices in demodulating the rest of the message.

The address field 413 may include a wireless address such as a user-selected code of 8 or 12 or 16 bits, configured to be different for each of the user devices in range of each other, for example. The location field 414 may include the latitude and longitude of the user device, optionally abbreviated as described above. The motion fields 415 may indicate the speed and direction of the user device, as described above. Mobile user devices such as vehicles in traffic may exchange sidelink location update messages as shown to inform each other of their presence, location, and motion, so that the other user devices can transmit to them using an appropriate power level, and so that collision-avoidance software can use the data to construct a local traffic map and thereby detect imminent collisions, among other uses.

Figure 5A:
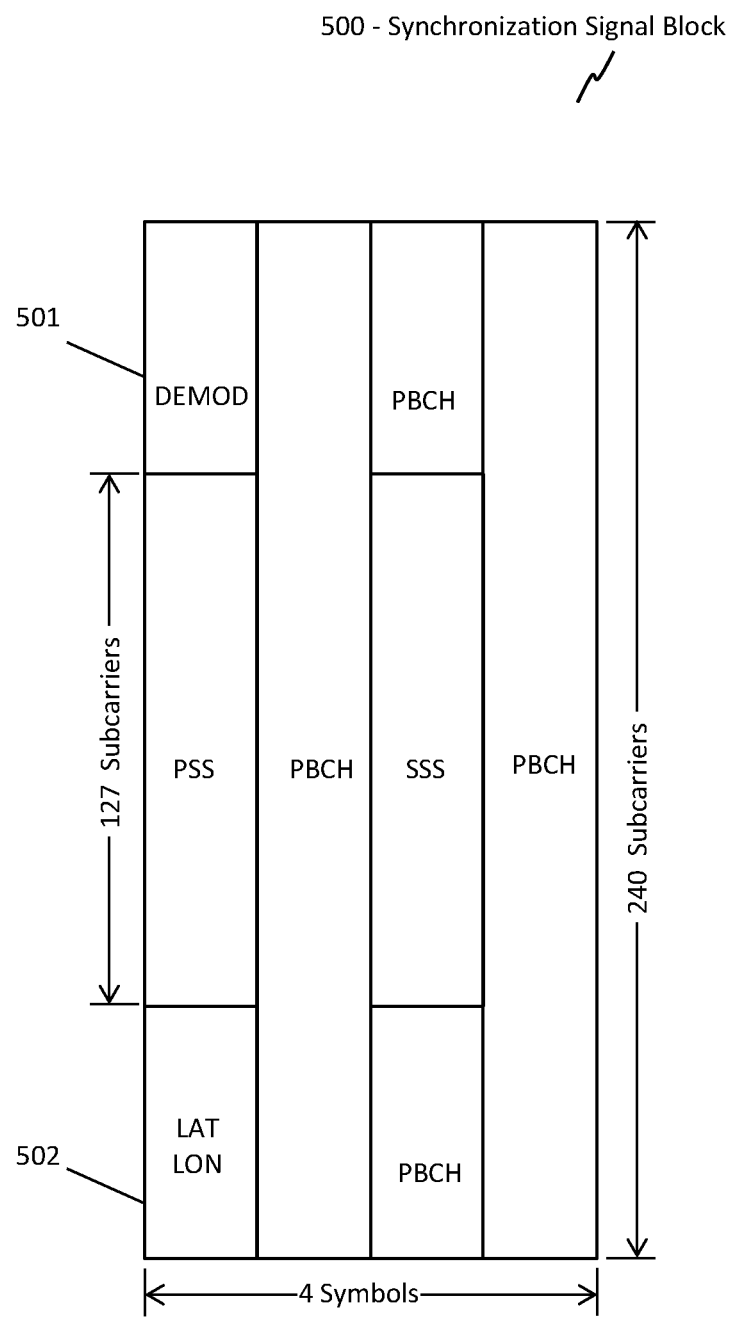
FIG. 5A is a schematic showing an exemplary embodiment of a message format for base stations to indicate locations to user devices, according to some embodiments.

FIG. 5A is a schematic showing an exemplary embodiment of a message format for a base station to indicate its location to user devices, according to some embodiments. As depicted in this non-limiting example, a modified SSB (synchronization signal block) 500 in 5G/6G includes 4 symbol times and 240 consecutive subcarriers, all modulated in QPSK. Within the message 500 are a PSS (primary synchronization signal) of 127 subcarriers, a SSS (secondary synchronization signal) also 127 subcarriers, and four regions with PBCH (physical broadcast channel) which, in this context, includes the MIB (master information block). The PSS, SSS, and PBCH(MIB) provide system information that a user device may require, in order to receive messages on a particular cell. The remaining two regions, indicated as 501 and 502, are unassigned in 5G/6G.

In the depicted embodiment, a demodulation reference is inserted into the first unassigned region 501, to assist user devices in demodulating the rest of the message, and a location is inserted into the second unassigned region 502, indicating the latitude and longitude of the base station (or the antenna of the base station). The full geographical location of the base station may include eight digits for each of the latitude and longitude in decimal degrees, for example, thereby providing about one-meter resolution. The number of bits needed for this resolution is about 53 or 54 depending on encoding, or 27 resource elements at QPSK. Thus the full geographical coordinates can fit within the second region 502, which includes 56 or 57 subcarriers. Thus the base station can indicate, in its SSB message, its location at meter-scale resolution, with no increase in the bandwidth required, and no increase in the time required, for the message.

Figure 5B:
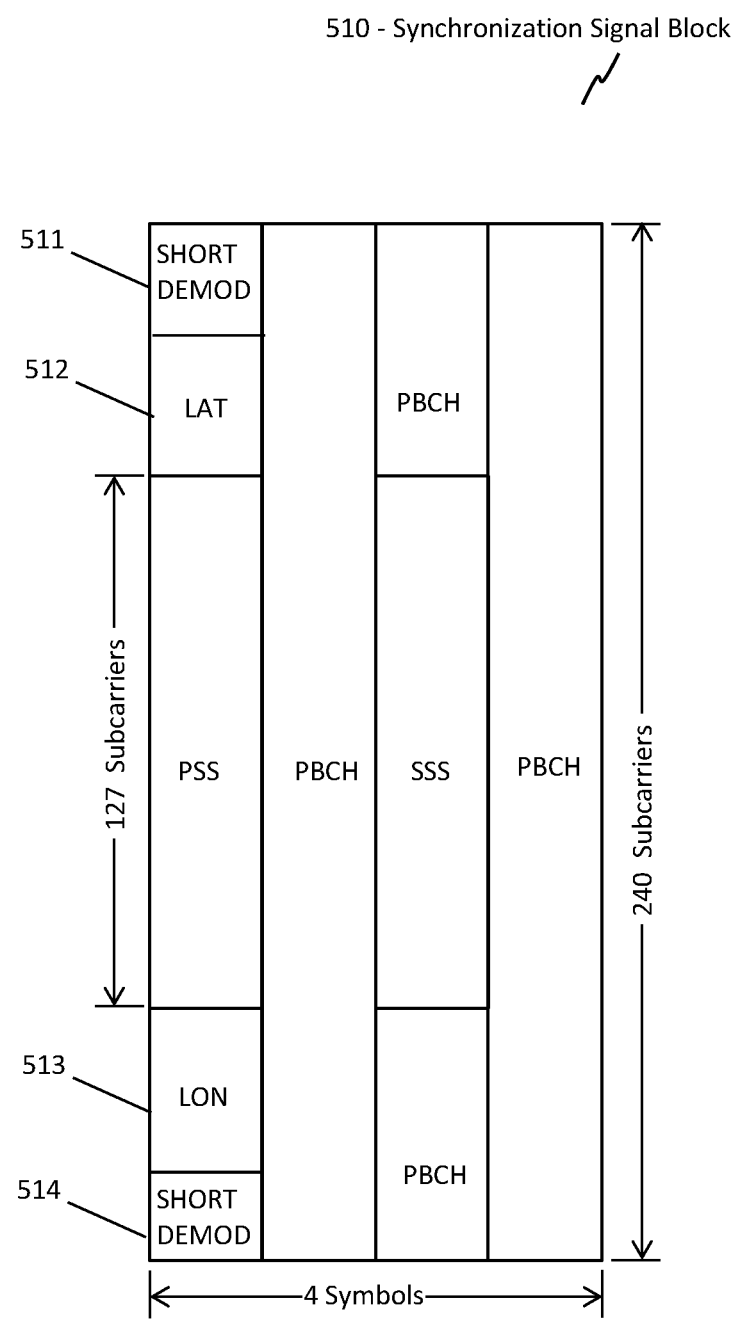
FIG. 5B is a schematic showing another exemplary embodiment of a message format for base stations to indicate locations to user devices, according to some embodiments.

FIG. 5B is a schematic showing another exemplary embodiment of a message format for base stations to indicate locations to user devices, according to some embodiments. As depicted in this non-limiting example, another modified SSB message 510 may include the usual PSS-SSS-PBCH(MIB) structure, plus four new items in the previously unallocated fields of the first symbol time. The modified SSB message 510 may include a short-form demodulation reference 511, shown in the four highest-frequency subcarriers, followed by the latitude value 512. After the PSS, the longitude value 513 is shown followed by another short-form demodulation reference 514 in the lowest-frequency subcarriers. Each of the short-form demodulation references 511 and 514 is four consecutive reference elements of the message 510, modulated according to all four values of the phase used in the modulation scheme. (There is no amplitude modulation in QPSK). By providing the short-form demodulation references at the highest and lowest frequency subcarriers, within the message body 510, the rest of the message may be demodulated despite interference and noise. For example, each element of the message 500 may be compared to an interpolated, or weighted average, of the modulation levels exhibited in the short-format demodulation references 511 and 514. Since the demodulation references 511 and 514 are generally affected by noise and interference in the same way as the rest of the message, each message element may be demodulated according to the interpolated average of the two demodulation references 511 and 514, thereby mitigating the noise and interference including frequency-dependent noise and interference, according to some embodiments.

Figure 5C:
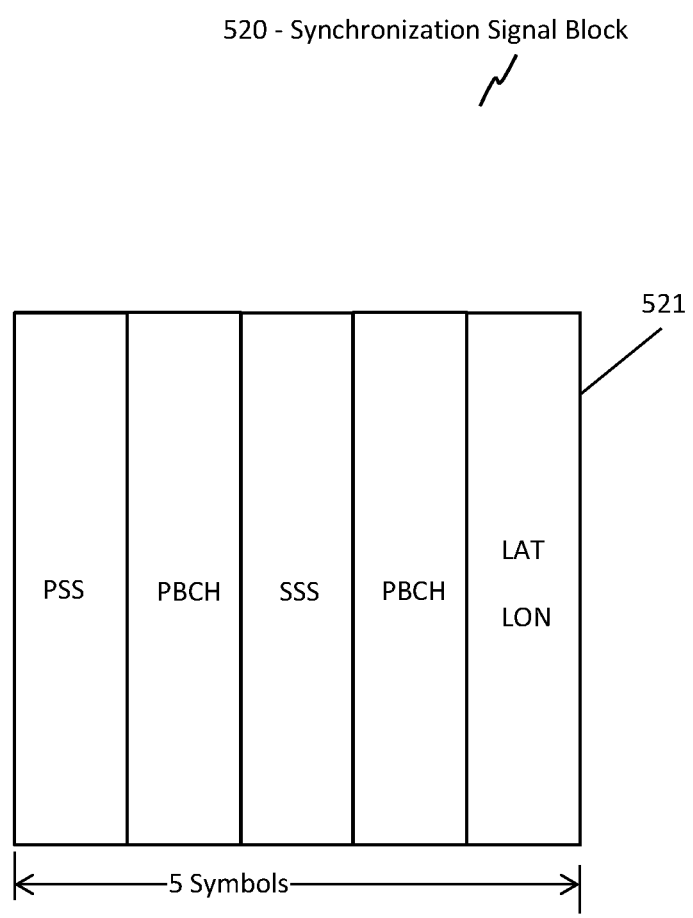
FIG. 5C is a schematic showing an exemplary embodiment of a low-complexity message format for a base station to indicate its location to user devices, according to some embodiments.

FIG. 5C is a schematic showing an exemplary embodiment of a low-complexity message format for a base station to indicate its location to user devices, according to some embodiments. As depicted in this non-limiting example, in a low-complexity SSB message 520, the bandwidth may be reduced to that required for transmitting the PSS and SSS portions, and the size of the BPCH portions may be reduced by reducing the number and complexity of parameters, and a fifth symbol 521 may be added. The fifth symbol 521 may contain the latitude and longitude, and optionally other data, of the base station.

Alternatively, the location data may be included in the PBCH, and a fifth symbol may be added to accommodate the PBCH with the location data included. As a further alternative, the low-complexity PBCH may accommodate the location data without the need for a fifth symbol, depending on how many parameters are specified in the low-complexity PBCH.

An advantage of providing the base station location in the SSB message may be to inform each new arrival user device of the base station's location before the user device attempts to acquire further system information and begin transmitting to the base station. An advantage of placing two short-form demodulation references at the top and bottom subcarriers may be that frequency-dependent interference and external noise can be mitigated by comparing the phase of each message element to the two short-form demodulation references 511 and 514 or to an interpolated average of the corresponding phase values. An advantage of informing user devices of the base station's location may be that the user devices can then adjust their transmit power for satisfactory reception at the base station without a power scan.

The examples disclosed above were focused on setting a transmission power based on just one or two factors, such as the distance or an obscuration. But in real communications, many other factors may be relevant to the power decision. For example, increased transmission generally increases the overall interference, which likely increases the message failure rate and average delays experienced by other members of the network. On the other hand, reducing the transmission power on one message, or on all the messages, may make them susceptible to external interference and noise, such as motor and switchgear emissions. Determining an appropriate power level to transmit any particular message is a complex process due to many competing factors which influence each other in complex ways. Therefore, to resolve this problem, the systems and methods include an artificial intelligence model, trained with massive machine learning, for predicting network performance based on transmission power conventions. The systems and methods further include an algorithm derived from the AI model, which base stations and/or user devices can use to adjust their transmission power levels based on the current input factors. Further details are explained in the following examples.

FIG. 6A is a schematic showing an exemplary embodiment of an artificial intelligence structure such as a neural net. Inputs and outputs are arranged to form an AI model predicting network behavior according to a transmission power level of messages, according to some embodiments.

As depicted in this non-limiting example, a predictive AI structure 600 may be configured as a neural net, or as another type of artificial intelligence or machine learning structure that provides predictions based on input factors. The depicted AI structure 600 includes an input layer 601 of input parameters represented as boxes, one or more output 607 value(s) represented as a triangle, and two layers of internal functions 603 and 605 represented as circles. (The various items are sometimes called "nodes", not to be confused with the nodes of a wireless network.) Weighted directional links 602 indicate the flow of input data from the inputs 601 to the first internal layer 603, and additional weighted directional links 604 indicate the flow of processed data from the first internal layer 603 to the second internal layer 605, and further weighted directional links 606 indicate the flow of processed data from the second internal layer 605 to the output 607.

When provided with specific input parameters, and "trained" or adjusted to solve a particular problem, the AI structure 600 becomes an "AI model" which, in this case, predicts network performance. The AI model can predict the subsequent network performance following a message transmission with a particular power or amplitude level. The prediction is according to the input parameters, and thereby determines the effects of setting the transmit power level of messages to various levels. The inputs 601 may include network operational parameters 608 such as the current message failure rate, the current throughput (in messages per second or bits per second, for example), the frequency of messages that do or do not obtain their desired QoS or QoE, the average message delay or latency, the number of active user devices in the network, the geographical extent of the network, the presence of mobile or fixed user devices, among other network parameters. The inputs 601 may further include parameters of the current message 609, such as the transmitter power used in transmitting the current message, the distance between the transmitter and receiver, the size of the message, the QoS or QoE expected by the recipient for the current message, whether the recipient is currently obscured and by how much, whether a prearranged fee or other financial arrangement is in place (with either the recipient or the message originator), whether the message is one of a series of messages or fragments, and other message parameters. The inputs 601 may further include external or environmental factors 610 such as the current noise or interference level from external sources, whether the base station has recently received complaints of interference from other adjoining networks, the spatial density of active user devices in the current cell and in the geographical area, among other external factors. In addition, a final input 611 is the measured network performance after the message has been transmitted, however, this input 611 is not provided to the structure; it is used as a training value. In some embodiments, the network performance 611 may be quantified as a single metric, such as the throughput minus twice the message failure rate, or as a plurality of calculated values, such as the throughput, the retransmit rate, and the average delay per message, for example. The predicted output 607 may be cast in the same form. Then the measured network performance metric 612 can be compared 613 with the predicted output 607 to evaluate the accuracy of the AI model predictions.

The weighted directional links 602, 604, 606 may include mathematical operations, such as multiplying the output from each node of a previous layer by a predetermined coefficient, and then passing the product to one or all of the nodes of the next layer, among other possible computation. In some embodiments, the links 602 and 604 perform no computation, and all functionality is contained in the internal functions 603 and 605. Although links are shown in the figure connecting each node to just a portion of the next layer for clarity, in some embodiments every node of each layer is linked to every node of the next layer.

The internal functions 603 and 605 may include any mathematical or logical functions of the inputs. In various embodiments, each internal function 603 or 605 may include arithmetic or mathematical formulas, nonlinear functions (such as exponential or arctangent compression functions), Boolean logic (such as, "take input A if input B is larger than C, and take input D otherwise"), among many other functional options. Each internal function 603 and 605 may include one or more variables or adjustable parameters. In some embodiments, the internal functions 603 and 605 perform the same operations on all of their inputs, whereas in other embodiments the internal functions process each data flow from each connected link differently. In some embodiments, the directional links are simply passive conduits, and all the weighting factors and calculations are included in the internal functions. In some embodiments, the structure 600 may include feedback or bidirectional links or other complex topology not depicted here.

The output 607 is, in this case, a prediction of the subsequent network performance after transmission of the message with the indicated power level. The network performance output 607 may be quantified as a performance metric, as mentioned. The output 607 may thereby indicate how the choice of transmission power influences the subsequent performance of the network. For example, if the message is sent with too much power, interference complaints from adjacent cells may increase, whereas if the message is sent with insufficient power, the message failure rate may increase and delays (such as retransmission delays) may increase. In some embodiments, network examples with similar parameters may be clustered or averaged, and the averaged parameters may be presented to the AI model as inputs, thereby saving computer time and potentially exposing more subtle effects.

The variables and weighting factors and other adjustable variables may be adjusted to "tune" or "train" the model based on network data. The AI model may initially start with the adjustable variables in arbitrary states, or set by logic or intuition, or otherwise. Then, data from actual network activity may be used as the inputs 601 and the AI model may calculate (or predict) a subsequent performance metric 607. Specifically, the data may include "pre-transmission" data, which is data measured before the message is transmitted. The prediction is then compared 613 to the measured "post-transmission" performance metric 612 of the network, measured subsequent to the message. In training the AI model, each variable (or a group of variables) may be adjusted in some "direction", and the prediction may be again calculated and compared with the actual metric. If the prediction is improved by that variation, the variables may be adjusted further in the same direction; but if the prediction is worse, the variables may be adjusted in the opposite direction or in some other direction. In each adjustment or series of adjustments of the variables, the most influential variables may be determined empirically, either by varying them individually or by tracing backwards from the output 607, and subsequent variations may focus primarily on those influential variables. This iterative training process, of repeated variation and comparison of the prediction, may be repeated for a large number of different message types with different transmission power levels under different network situations until, eventually, a particular set of values may be found that provides satisfactory predictions of network performance across a wide variety of situations and transmission power levels.

The next step may be to prepare an algorithm that base stations can use to determine how much transmission power to employ in transmitting each particular message. In some embodiments, the algorithm may be the AI structure itself, but with the variables frozen at the most advantageous settings. For ease of use by the base stations, the algorithm may be configured to specify the preferred transmission power level instead of predicting the network performance metric. In addition, the algorithm may be simplified by removing the least-productive inputs and internal functions and links. In other embodiments, the algorithm may be distinct from the AI model but based on it. For example, the algorithm may be a computer program or subroutine, an interpolatable tabulation of values, or a graphical device, among many other calculation means for specifying a particular transmission power level for each message according to message parameters, current network conditions, and observed environmental inputs. The base station can use the algorithm to select an appropriate power level and then transmit the message with the indicated power level.

In addition, to assist user devices in determining how much power to apply to uplink and sidelink transmissions, a similar algorithm may be developed for user devices. The user-device version of the algorithm may be smaller than the base-station version because user devices generally do not know many of the network parameters that a base station has access to. However, the user device generally does know about the planned uplink message, as well as many environmental factors (noise, etc.), and those factors may be sufficient to guide the power level decisions of user devices.

When AI-derived algorithms are used by base stations and/or user devices to select appropriate transmission power levels of messages, the network may achieve improved reliability, lower latency due to fewer delays, higher energy efficiency by avoiding wasted power, and improved overall network performance, according to some embodiments.

FIG. 6B is a flowchart showing an exemplary embodiment of a procedure for a mobile user device and/or a base station to select a transmission power level, according to some embodiments. As depicted in this non-limiting example, at 651, an AI model is developed to predict network performance (or a metric thereof) based on inputs such as distance to receiver, current backgrounds, current traffic density, message size, QoS involved, and a potentially large number of other input parameters. After setting up the AI structure, typically in a supercomputer, a large number of network situations can be measured and then provided as inputs 652 to the model. Each such situation may include network parameters, message parameters, and/or environmental parameters measured pre-transmission, as well as the transmission power level to be used in transmitting the message.

At 653, the AI model is used to predict the network performance post-transmission, thereby quantifying the effects of the message transmission. The predictions may be compared to the actual network performance subsequent to the message transmission. The adjustable variables in the AI model may be varied to successively and iteratively improve the accuracy of the output predictions regarding the network performance versus the power level selected. In most cases, with sufficient input data and sufficient coverage of the relevant input parameters, the predictive accuracy of the AI model may improve and eventually become satisfactory over a wide range of operational cases. In that case, the results can be used to guide base stations in adjusting their transmission power levels thereafter.

At 654, a handy algorithm or other calculational means may be developed from the AI model, configured to assist base stations in setting downlink transmission power levels. The algorithm may be the AI model itself, or a portion thereof, or a simplified version, and preferably adapted to select a transmission power level instead of predicting network metrics. Alternatively, instead of copying the AI model, the algorithm may be a different type of calculation tool configured to select a transmission power level. For example, the algorithm may be in the form of a computer program or subroutine, an ASIC (application-specific integrated circuit), an FPGA (field-programmable gate array), an electronic device including analog functions, a multi-dimensional tabulation of preferred power levels each input parameter on a separate dimension, or other means for selecting a power level according to the inputs. Artisans may develop other calculation tools for performing the task of the algorithm.

In addition, at 655, networks may be configured to provide further feedback to the AI model by recording the network performance and other data versus the transmission power level used. The resulting performance data may be passed to the AI model and used to develop an even more precise algorithm, which base stations can then use in selecting transmit power levels.

As mentioned, a similar AI model and associated algorithm may be developed to assist user devices in selecting uplink and sidelink power level settings. The algorithm adapted for user devices may provide a valuable guide as to the power level for message power levels based on information that the user device has, such as message size and current interference levels. When user devices select their message transmission power levels according to such an AI-derived algorithm, improved efficiency, reliability, and latency may be obtained by the user device and the network in general, according to some embodiments.

Figure 7A:
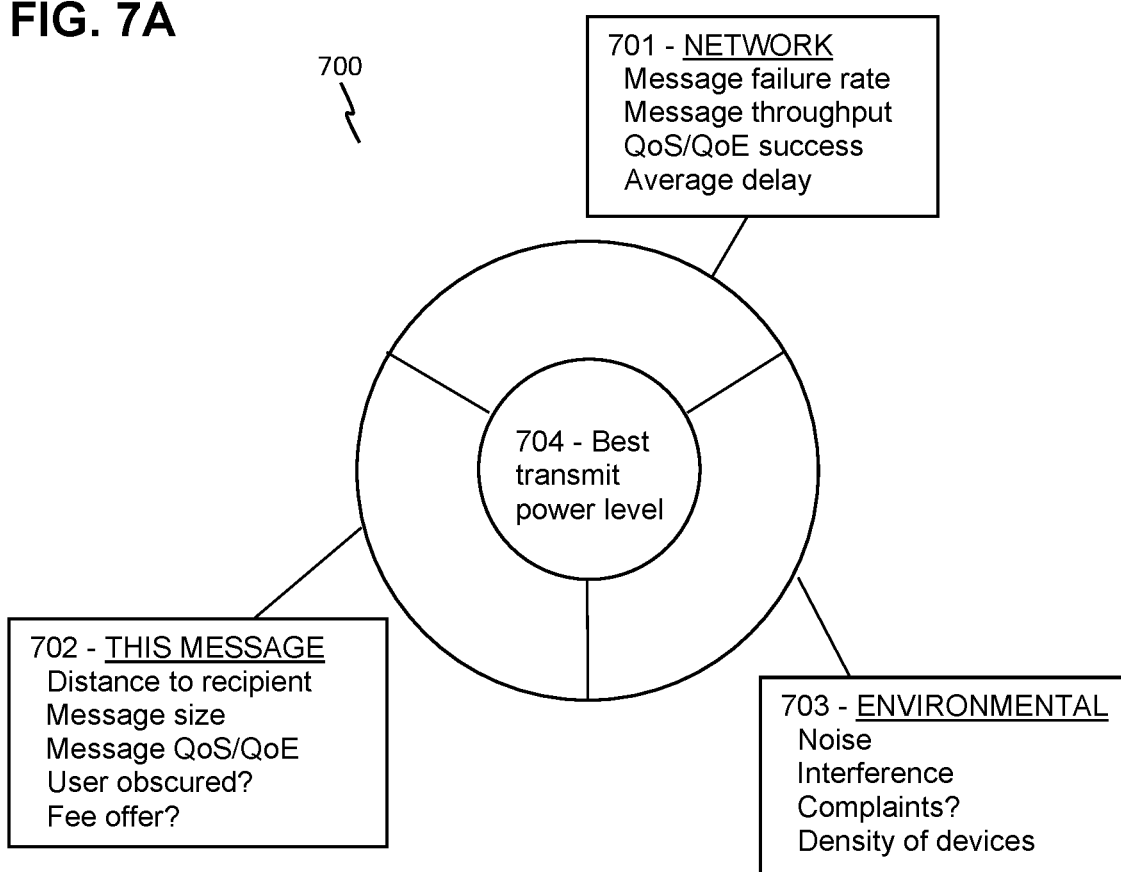
FIG. 7A is a schematic showing an exemplary embodiment of parameters affecting a transmission power allocation, according to some embodiments.

FIG. 7A is a schematic showing an exemplary embodiment of some pre-transmission parameters that may affect the subsequent network performance, including the transmission power allocation, according to some embodiments. As depicted in this non-limiting example, the input parameters 700 of an AI model, configured for selecting a transmission power level 704, may include network parameters 701 such as a message failure rate, a message throughput rate, a rate of failure or success in meeting clients' QoS and QoE expectations, the average or maximum or mean delay per message (aside from irreducible delays due to protocols, etc.), the number of user devices registered on the network and the number active currently, the geographical size of the network and whether other cells overlap the subject cell (and if so, how many non-member user devices are currently active within the geographical extend of the subject cell), presence or absence of a non-radio link to a core network and/or the Internet (such as an optical or coaxial cable, or a microwave link not competing with the wireless radio spectrum), among many other possible network parameters. The input parameters may further include parameters 702 relating to the message and the user device, such as the distance to the recipient, the size of the planned message and whether it includes fragments, the QoS or QoE requested, whether the user device is currently obscured by a building or a hill for example, whether the user device is mobile and if so how it is moving, whether the user device has agreed to a fee or subscription related to this message, the modulation, the frequency, the bandwidth, and many other related parameters potentially affecting the power decision. The input parameters may also include environmental or external parameters 703 such as the extant noise and interference, how close the cell is spatially to other cells (including overlaps, as mentioned), whether the other cells have recently submitted complaints regarding interference from the subject cell, the density of other wireless devices in the area, and many other environmental factors.

Figure 7B:
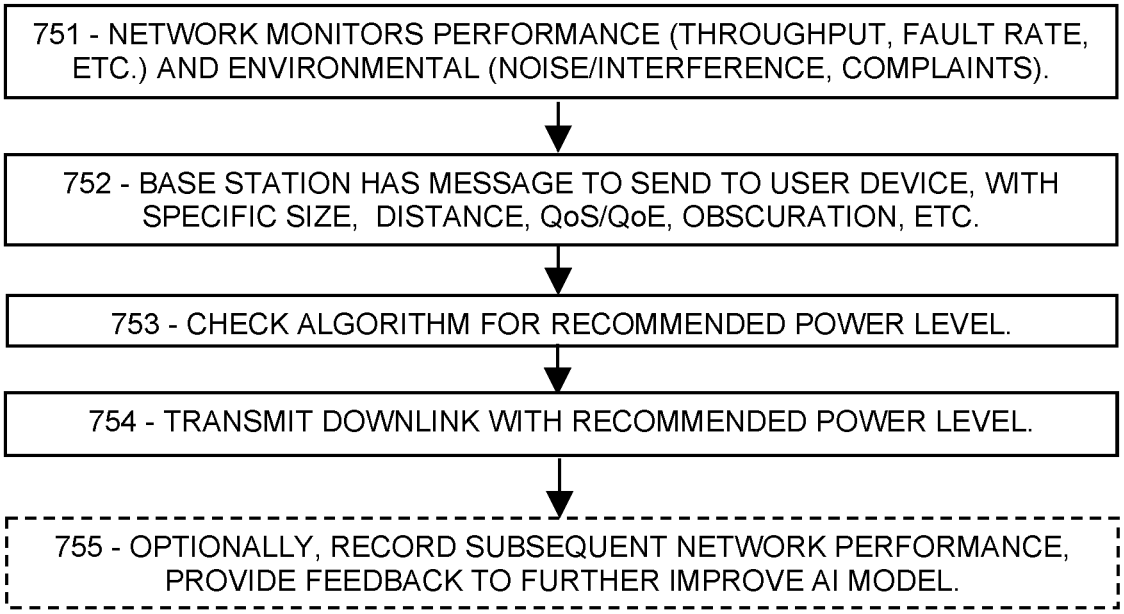
FIG. 7B is a flowchart showing an exemplary embodiment of a procedure for creating and using an AI algorithm, according to some embodiments.

FIG. 7B is a flowchart showing an exemplary embodiment of a procedure for creating and using an AI-based algorithm, according to some embodiments. As depicted in this non-limiting example, at 751 a cell or network or base station may monitor network operational parameters pre-transmission, such as the message throughput, the fault or failure rate, average delays, retransmissions, as well as external factors such as noise and interference, presence of complaints from other cells for interference, and the like. Then, at 752, the base station may have a message to send to a user device. The message parameters include its size, the priority or QoS or QoE expected, as well as parameters about the user device such as its distance, whether the user device is currently in an obscured or otherwise challenging reception zone, and whether the owner of the user device has arranged for special handling such as a fee for service, emergency priority, and the like. At 753, the base station (or its core network) may input those parameters into an algorithm configured to select a message transmission power level based on, for example, an AI model which has been trained on data from the subject cell or similar cells. Then at 754, the base station transmits the message downlink to the user device using the power level selected by the algorithm. Optionally (in dash), at 755 the base station may record the post-transmission network performance, or a metric derived from the network performance parameters, in order to provide fresh examples to the AI model and obtain further improvement in future message power selections.

In some embodiments, the algorithm may also be used to select the transmit power level of broadcast messages, in addition to unicast messages. For example, the algorithm may be configured to recommend a power level for a broadcast message such that the most remote active user device can receive the broadcast message. Alternatively, the power level can be set so as to be reliably received by a predetermined fraction such as 90% of the active user devices, or to be reliably received by all of the user devices that demand high QoS or QoE, or other formula relating the power level to the distribution of user devices in the cell.

5G, and especially 6G, have enormous potential for communications between mobile user devices and other entities, such as base stations, vehicles in traffic, roadside devices, and innumerable other applications for low-cost wireless communication. The systems and methods disclosed herein are intended to provide means for base stations and user devices to transmit messages using power levels selected according to network experience and current conditions, and thereby to reduce message failures, interference with other cells, and time lost to retransmissions, thereby improving network operation and customer satisfaction overall.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touch-screen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a base station in a wireless network to transmit a message, the method comprising:
   a. measuring one or more network parameters, one or more message parameters, and one or more environmental parameters;
   b. providing the measured network parameters, message parameters, and environmental parameters as inputs to an algorithm configured to provide, as output, a recommended transmission power level; and
   c. transmitting the message according to the recommended transmission power level, wherein:
   d. the network parameters comprise a message throughput or a message failure rate;
   e. the message parameters comprise a distance from the base station to a recipient of the message; and
   f. the environmental parameters comprise a noise or interference level.

2. A method for a base station in a wireless network to transmit a message, the method comprising:
   a. measuring one or more network parameters, one or more message parameters, and one or more environmental parameters;
   b. providing the measured network parameters, message parameters, and environmental parameters as inputs to an algorithm configured to provide, as output, a recommended transmission power level; and
   c. transmitting the message according to the recommended transmission power level, wherein:
   d. the algorithm is based at least in part on an artificial intelligence model comprising one or more adjustable variables; and
   e. the one or more adjustable variables are adjusted to predict network performance based, at least in part, on the one or more network parameters, the one or more message parameters, and the one or more environmental parameters.

3. The method of claim 2, wherein:
   a. the artificial intelligence model comprises one or more internal functions comprising mathematical expressions, an output value comprising a network performance parameter or a metric derived therefrom, and a plurality of directed links connecting each input parameter to at least one of the internal functions, and a further plurality of directed links connecting at least one of the internal function to the output value.

4. The method of claim 3, wherein:
   a. each directed link comprises a transfer of information from a first node to a second node, the first node comprising one of the input parameters or one of the internal functions, and the second node comprising one of the internal functions or the output value.

5. The method of claim 3, wherein the adjusting of the one or more adjustable variable comprises:
   a. comparing the output value to a measured network performance parameter or to a metric derived therefrom; and
   b. varying the one or more adjustable variables according to a difference between the measured network performance parameter and the output value.

6. The method of claim 3, further comprising:
   a. after transmitting the message, measuring a post-transmission network performance parameter; and
   b. comparing the output value of the artificial intelligence model to the post-transmission network performance parameter.

7. Non-transitory computer-readable media in a base station or core network of a wireless network, the media comprising instructions that when executed cause a method to be performed by the base station or core network, the method comprising:
   a. determining one or more message parameters of a particular message which is to be transmitted;
   b. measuring one or more pre-transmission network parameters of the wireless network before the particular message is transmitted;
   c. providing, as input to an algorithm, the one or more pre-transmission network parameters and the one or more message parameters;
   d. determining, as output from the algorithm, a particular transmission power level; and
   e. then transmitting the particular message according to the particular transmission power level.

8. The media of claim 7, wherein the algorithm is derived at least in part from an artificial intelligence model.

9. The media of claim 7, wherein:
   a. the pre-transmission network parameters comprise a message throughput or a message failure rate or an average message delay time or a combination of these, measured before the particular message is transmitted.

10. The media of claim 7, wherein the one or more message parameters comprise a distance from the base station to a recipient of the message.

11. The media of claim 7, wherein the algorithm comprises computer software or firmware configured to receive, as input, the one or more pre-transmission network parameters and the message parameters, and to provide, as output, the recommended transmission power level.

12. The media of claim 7, the method further comprising:
   a. measuring one or more post-transmission network parameters comprising a message throughput or a message failure rate or an average message delay time or a combination of these, measured after the message is transmitted;
   b. then providing, as input to an artificial intelligence model, the transmission power level, the one or more message parameters, and the one or more pre-transmission network parameters measured before transmitting the message, wherein the artificial intelligence model is configured to predict the one or more post-transmission network parameters.

13. A user device registered on a wireless network, the user device comprising a wireless transmitter and non-transitory computer-readable media, wherein:
   a. the media comprise an algorithm configured to take, as input, one or more parameters of a message and one or more environmental parameters, and to produce, as output, a recommended transmission power level; and
   b. the transmitter is configured to transmit a message according to the recommended transmission power level;
   c. the algorithm is based, at least in part, on an artificial intelligence model comprising input values connected by directed links to one or more internal functions;

d. one or more of the internal functions is connected by directed links to one or more output values;
e. the input values comprise at least a transmission power level of a message transmitted by the user device; and
f. the internal functions comprise adjustable variables that are adjusted according to a network performance metric.

14. A user device registered on a wireless network, the user device comprising a wireless transmitter and non-transitory computer-readable media, wherein:
a. the media comprise an algorithm configured to take, as input, one or more parameters of a message and one or more environmental parameters, and to produce, as output, a recommended transmission power level; and
b. the transmitter is configured to transmit a message according to the recommended transmission power level;
c. wherein the network performance metric comprises an arithmetic combination of at least two of:
   i. the message throughput of the network;
   ii. the message failure rate of the network: and
   iii. the average delay time per message of the network.

\* \* \* \* \*